(12) United States Patent
Laur et al.

(10) Patent No.: US 9,555,807 B2
(45) Date of Patent: Jan. 31, 2017

(54) AUTOMATED VEHICLE PARAMETER MODIFICATION BASED ON OPERATOR OVERRIDE

(71) Applicant: Delphi Technologies, Inc., Troy, MI (US)

(72) Inventors: Michael H. Laur, Mission Viejo, CA (US); John P. Absmeier, Capitola, CA (US); Tory P. Smith, Mountain View, CA (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/701,796

(22) Filed: May 1, 2015

(65) Prior Publication Data

US 2016/0318515 A1 Nov. 3, 2016

(51) Int. Cl.
*G05D 1/00* (2006.01)
*B60W 30/182* (2012.01)

(52) U.S. Cl.
CPC .......... *B60W 30/182* (2013.01); *G05D 1/0061* (2013.01); *G05D 1/0088* (2013.01); *B60W 2540/10* (2013.01); *B60W 2540/12* (2013.01); *B60W 2540/18* (2013.01); *B60W 2550/308* (2013.01); *B60W 2900/00* (2013.01)

(58) Field of Classification Search
CPC combination set(s) only.
See application file for complete search history.

(56) References Cited

U.S. PATENT DOCUMENTS

| 8,948,955 | B2 | 2/2015 | Zhu et al. | |
| 9,254,846 | B2 | 2/2016 | Dolgov et al. | |
| 2002/0188404 | A1 | 12/2002 | Jeon | |
| 2006/0290479 | A1* | 12/2006 | Akatsuka | B60Q 9/008 340/425.5 |
| 2008/0189012 | A1 | 8/2008 | Kaufmann | |
| 2009/0018723 | A1* | 1/2009 | Chevion | B60W 50/16 701/36 |
| 2009/0174540 | A1* | 7/2009 | Smith | B60Q 1/34 340/465 |
| 2012/0271500 | A1 | 10/2012 | Tsimhoni et al. | |
| 2012/0283894 | A1* | 11/2012 | Naboulsi | A61B 5/18 701/1 |
| 2013/0184926 | A1* | 7/2013 | Spero | B62D 1/28 701/26 |
| 2014/0039892 | A1* | 2/2014 | Mills | G06F 21/32 704/246 |

(Continued)

FOREIGN PATENT DOCUMENTS

JP 2006-347531 A 12/2006
JP 2012-051441 A 3/2012

*Primary Examiner* — Yonel Beaulieu
(74) *Attorney, Agent, or Firm* — Lawrence D Hazelton

(57) ABSTRACT

A system for automated operation of a host-vehicle includes a controller configured to operate the host-vehicle during automated operation of the host-vehicle. The controller is configured to do so in accordance with a parameter stored in the controller. The controller is also configured to determine when an operator of the host-vehicle uses a vehicle-control-input to override the controller and thereby operate the host-vehicle in a manner different from that which is in accordance with the parameter. The controller is also configured to modify the parameter in accordance with the manner of the operator.

17 Claims, 4 Drawing Sheets

(56) References Cited

U.S. PATENT DOCUMENTS

2014/0309879 A1* 10/2014 Ricci .................... H04W 48/04
 701/36
2015/0088358 A1 3/2015 Yopp

* cited by examiner

AUTOMATED VEHICLE PARAMETER MODIFICATION BASED ON OPERATOR OVERRIDE

TECHNICAL FIELD OF INVENTION

This disclosure generally relates to an automated operation system of a host-vehicle, and more particularly relates to modifying control parameters when the operator overrides the automated operation of the host-vehicle to operate the host-vehicle in a manner that is different from how a controller of the system would operate the host-vehicle, i.e. not in accordance with pre-existing or pre-programmed parameters used by the controller.

BACKGROUND OF INVENTION

Automated or autonomous operation of a host-vehicle such as an automobile has been suggested. The degree of automation includes full automation where the operator of a host-vehicle does not directly control any aspect of vehicle operation. That is, the operator is essentially a passenger, and a controller in the host-vehicle takes control of all steering, braking, and engine control (e.g. acceleration) operations of the host-vehicle. Various vehicle control decisions made by the controller, such as how close to follow behind a forward-vehicle, or what travel-lane of a multi-lane roadway is used, are based, at least in part, on pre-programmed parameters. However, the controller may be pre-programmed with parameters that are not entirely to the liking of the operator of the host-vehicle. For example, the operator may feel the controller is tail-gating and want increased separation between the host-vehicle and another vehicle in front of the host-vehicle. In other words, the operator may be more comfortable if the controller did not operate host-vehicle in accordance with a forward-minimum-distance parameter initially programmed into the controller, but used an increased value for the forward-minimum-distance parameter.

SUMMARY OF THE INVENTION

Described herein is an automated vehicle system that modifies various decision parameter values used by a controller for automated operation of a host-vehicle. One or more parameters may be modified if the operator of the vehicle takes some action to operate the host-vehicle in a manner that is different from how the controller would otherwise operate the host-vehicle. That is, the improved system described herein uses 'directed learning' techniques to decrease the frequency of system takeovers by an operator. The system described herein enables a sophisticated tagging and learning structure that allows the operator to make adjustments to the driving style of the automated vehicle system over time.

In accordance with one embodiment, a system for automated operation of a host-vehicle is provided. The system includes a controller configured to operate the host-vehicle during automated operation of the host-vehicle. The controller is configured to do so in accordance with a parameter stored in the controller. The controller is also configured to determine when an operator of the host-vehicle uses a vehicle-control-input to override the controller and thereby operate the host-vehicle in a manner different from that which is in accordance with the parameter. The controller is also configured to modify the parameter in accordance with the manner of the operator.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

The automated vehicle system described herein improves on the problems describe above by providing a machine learning structure that allows for 'directed learning' by a controller so the system can adapt to the driving preferences of an operator over time. For example, the operator may engage a traffic jam assist system, but be uncomfortable with how the system is handling a certain situation. In prior examples of automated vehicle systems, the only option is for the operator to terminate automated operation by the system.

The improved system described herein allows the operator to make adjustments to how an automated system handles certain situations. When the operator does something to indicate that a change is desired, the system tags the correction and saves information relevant one or more pre-existing parameters. For example, suppose a vehicle is navigating a busy interstate during rush hour using a traffic jam assist system. The driver sees an oversize load vehicle ahead in a neighboring lane that nearly protrudes into the vehicle's home lane. In prior systems, the operator either needs to trust the system to leave adequate space, or the operator must terminate the system, then operate the host-vehicle drive manually, and then later reengage the system.

The improved system described herein allows the operator to temporarily suspend control of the throttle, steering, and brakes while a corrective action is taken. The driver then has full control of the vehicle to pass by the oversize vehicle, leaving a comfortable amount of space. Various sensor and GPS data are tagged and stored during this corrective action, which is cued by the action of the operator. Once the oversize vehicle has been passed and the operator is comfortable once more, the operator may reengage the system. It is emphasized that the system is still analyzing the driving environment with all of its sensors and tagging the data while the operator manually performs the corrective maneuver.

The trajectory taken by the operator can be compared to the planned trajectory from the vehicle controller, both in relation to the driving conditions and nearby vehicles, pedestrians, etc. Over time, patterns emerging from these data can be analyzed to allow an automated system to better operate the host-vehicle in accordance with the driving preferences of the operator. These driving preference parameters could also be used in the development and testing phase of an automated vehicle system to create different default settings for automated functions, or by end-user (operator) for personalization of their vehicles.

Figure 1:
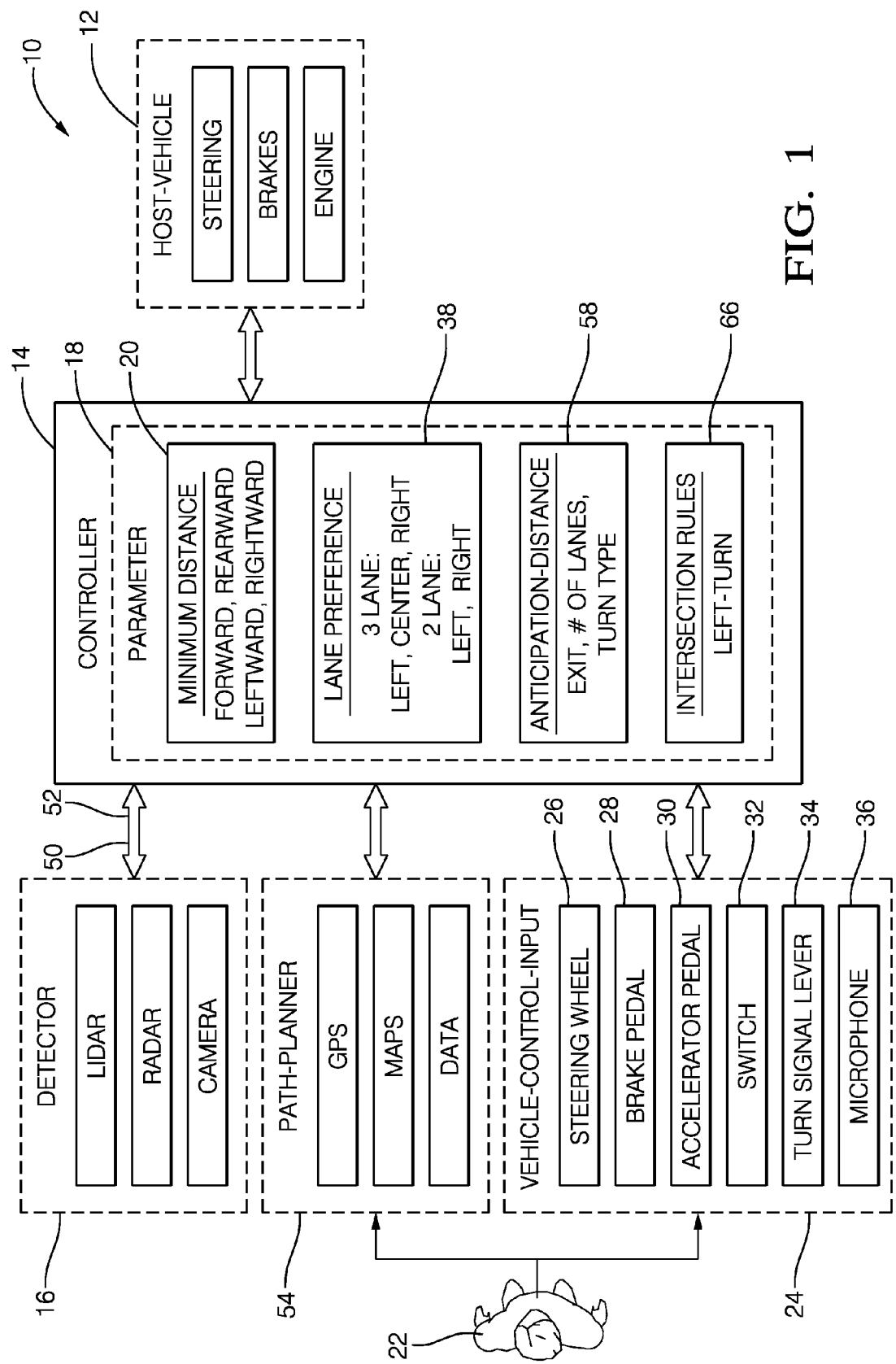
FIG. 1 is a diagram of a system for automated operation of a host-vehicle in accordance with one embodiment.

FIG. 1 illustrates a non-limiting example of a system 10 for automated operation of a host-vehicle 12. In general, the system 10 is able to control the speed, steering, brakes, and other aspects of operation of the host-vehicle 12. The means for doing these tasks (steering and speed control) are well-know and not described in any particular detail herein. However, the system 10 described herein is not limited to these tasks, and it is contemplated that the system may also control other vehicle functions such as operating the turn-signals of the host-vehicle, and/or selecting between high-beam and low-beam headlights. While the improvements described herein are presented in the context of a fully automated vehicle, it is contemplated that the improvements could be applied to vehicles that are not fully automated, i.e. vehicles that are only partially automated, as will become apparent as the system 10 is described in more detail below.

The system includes a controller 14 configured to operate the host-vehicle 12 during automated operation of the host-vehicle 12. The controller 14 may include a processor (not shown) such as a microprocessor or other control circuitry such as analog and/or digital control circuitry including an application specific integrated circuit (ASIC) for processing data as should be evident to those in the art. The controller 14 may include memory, including non-volatile memory, such as electrically erasable programmable read-only memory (EEPROM) for storing one or more routines, thresholds and captured data. The one or more routines may be executed by the processor to perform steps for operating the host-vehicle 12 as described herein.

The controller 14 may be configured to receive signals from a detector 16 that may include, but is not limited to: a light detection and ranging (LIDAR) unit, a radio detection and ranging (RADAR) unit, and/or an optical sensor unit, e.g. a camera. The detector 16 may output raw signals such as a time-interval for a radio signal to return to the RADAR unit, or a processed signal such as a distance to and/or relative size and/or a classification (large, small, in the path of the host vehicle, etc.) of an object detected by the detector 16. In the example presented herein, the detector 16 is characterized as outputting a processed signal only to simplify the description of the system 10. It is contemplated that the controller 14 may be configured to do all of the signal processing.

With the signals from the detector 16, the controller 14 may be able to steer and control the speed of the host-vehicle 12 along a roadway and not collide with objects such as other vehicles or roadway structures. In general, the controller 14 is configured to operate the host-vehicle 12, and do so (i.e. operate the host vehicle) in accordance with a parameter 18 stored in the controller 14. As used herein, the phrase 'in accordance with' the parameter 18 means that the controller uses the parameter 18 as, for example, a threshold to determine or decide which course of action should be taken with regard to operating the host-vehicle 12. For example, if the host-vehicle 12 is closer to an object than a minimum-distance-parameter 20, the controller may slow-down or steer the host-vehicle 12 so the minimum-distance-parameter 20 is not violated, i.e. is adhered to. That is, the controller 14 operates the host-vehicle 12 in accordance with the minimum-distance-parameter 20.

The controller 14 is further configured to determine when an operator 22 of the host-vehicle 12 uses a vehicle-control-input 24 to override the controller 14 and thereby operate the host-vehicle 12 in a manner different from that which is in accordance with the parameter 18. In one embodiment of the system 10, the vehicle-control-input 24 includes: a brake-pedal 28, an accelerator-pedal 30, and a steering-wheel 26, which are operable by the operator 22 to override what the controller 14 is doing to operate the host-vehicle 12.

During normal automated operation of the host-vehicle 12, operations such as steering by the wheels, deceleration by the brakes, and acceleration by the engine of the host-vehicle 12 are performed in accordance with the parameter 18, e.g. one or more of the individual parameters shown in FIG. 1. However, the system 10 is also configured so the operator 22 can forcibly over-power the intent or normal course of action of the controller 14 by, for example, moving (i.e. rotating) the steering-wheel 26, pressing on the brake-pedal 28, and/or pressing in the accelerator-pedal 30. For example, the operator 22 may by brute-force override the steering of the host-vehicle 12 by the controller 14 and rotate the steering-wheel 26 to steer the host-vehicle 12 into a travel-lane that is not in accordance with the parameter 18.

The controller 14 is further configured to temporarily or permanently release control of the host-vehicle 12 when the controller 14 detects that, for example, the steering-wheel 26 is being moved or rotated by the operator 22, and modify the parameter 18 in accordance with the manner of the operator. As used herein, the phrase 'the manner of the operator' is used to describe or characterize what the operator 22 desires regarding how the host-vehicle 12 is to be operated, and may alternatively be stated as 'in accordance with the apparent intent of the operator'. Examples of how the parameter 18, i.e. one or more of the individual parameters, can be modified by the operator 22 overriding the controller 14 are presented later in this description.

The controller 14 may be further configured to resume automated operating of the host-vehicle 12 after, for example, the operator 22 actuates a switch or push-button, or gives a voice command to resume automated driving. Alternatively, the controller 14 may be configured to automatically resume operation of the host-vehicle 12 if the operator 22 operates the host-vehicle 12 in accordance with the parameter 18 for a period of time, twenty seconds for example.

As an alternative to the brute-force overriding of the controller 14 by the operator 22 described above, the system 10 may include one or more of: a turn-signal lever 34, a switch 32, and a microphone 36; where these devices are operable by the operator 22 to indicate that operation of the host-vehicle in a manner different from the parameter 18 is desired. Use of these devices may then be used to indirectly 'instruct' the controller 14 to modify the parameter 18. For example, if the operator 22 wants the controller 14 to steer the vehicle into an adjacent-travel-lane, the operator 22 may operate the turn-signal lever 34 to indicate to the controller 14 that a lane change is desired, and the controller 14 may change the value of a lane-preference-parameter 38.

In some circumstances is may not be entirely self-evident to distinguish when the operator 22 is overriding the controller 14 to modify the parameter 18 from when the operator 22 is overriding the controller to address a special circumstance but the operator 22 does not want to modify the parameter. So the intent of the operator 22 is clear with regard to modifying the parameter 18, the switch 32 (e.g. a push-button) may be actuated by the operator to indicate that a learn-mode is to be entered where the controller 14 is modify the parameter 18 in accordance with the manner that the operator 22 operates the host-vehicle. The termination of learn-mode may also be clearly indicated by the operator again actuating the switch 32.

Figure 2:
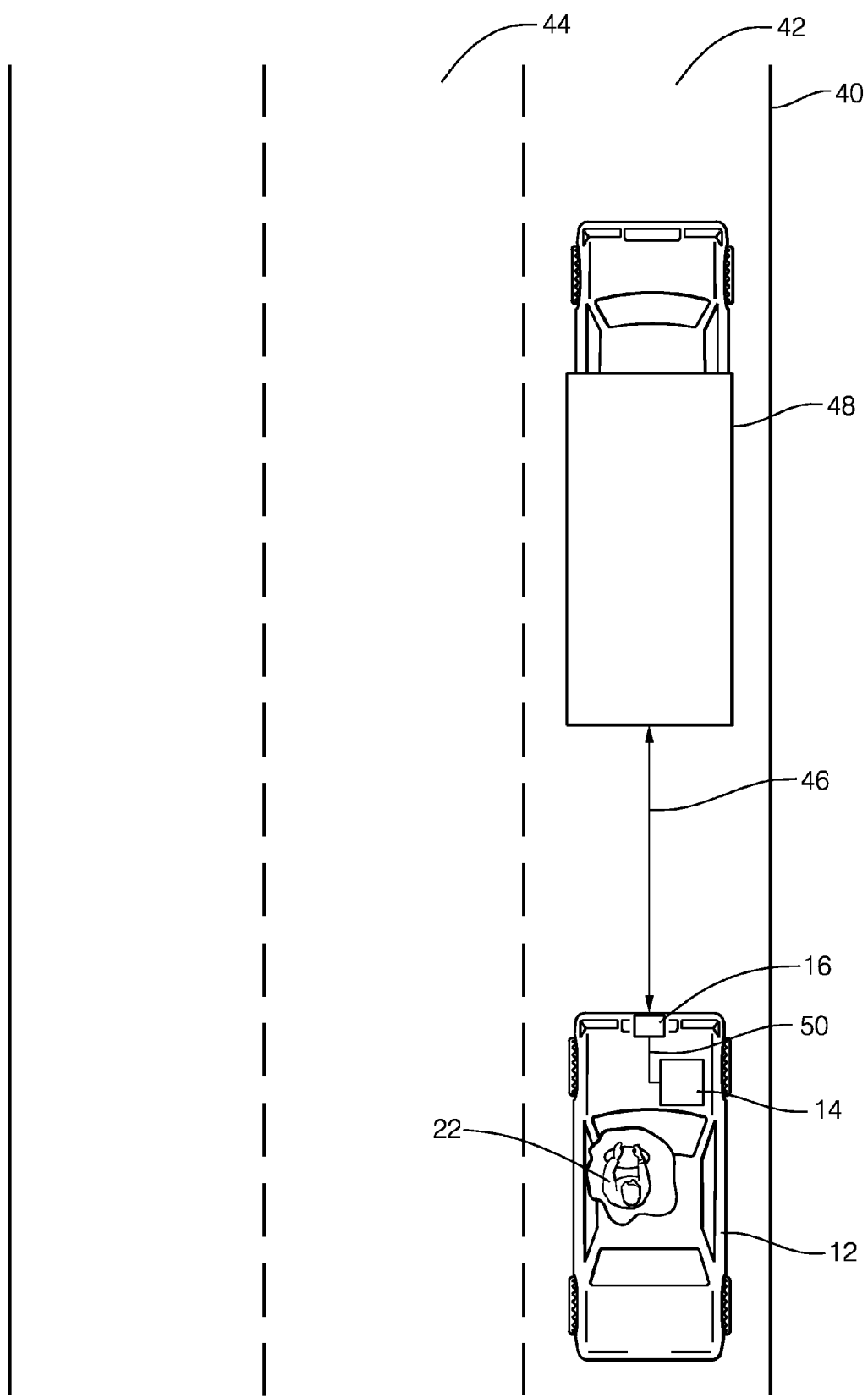
FIG. 2 is top view of a traffic scenario encountered by the system of FIG. 1 in accordance with one embodiment.

FIG. 2 illustrates a non-limiting example of a roadway 40 that defines a host-travel-lane 42 traveled by the host-vehicle 12, and an adjacent-travel-lane 44 next to or adjacent the host-travel-lane 42. As noted above, the system 10 includes a detector 16 configured to detect a distance 46 to an object 48 (a truck in this example) proximate to the host-vehicle 12, and provide a distance-signal 50 to the controller 14 indicative of the distance 46. The controller 14 may then be configured to operate the host-vehicle 12 in accordance with the distance-signal 50 and the minimum-distance-parameter 20 (FIG. 1). The controller 14 may modify the minimum-distance-parameter 20 when the operator 22 overrides the controller 14 such that the operator 22 operates the host-vehicle 12 in a manner that prevents the controller 14 from operating the host-vehicle 12 in accordance with the minimum-distance-parameter 20.

The minimum-distance-parameter 20 may include a forward-minimum-distance, a rearward-minimum-distance, a leftward-minimum-distance, and a rightward-minimum-distance. By way of example and not limitation, a suitable initial value for the forward-minimum-distance of the minimum-distance-parameter 20 may be twenty meters. By way of further example, the controller 14 may increase the forward-minimum-distance of the minimum-distance-parameter 20 when the operator 22 presses the brake-pedal 28 while the distance-signal 50 indicates that a forward-distance (the distance 46) to the object is greater than the forward-minimum-distance of the minimum-distance-parameter 20. That is, if the operator 22 presses the brake-pedal 28 while the distance 46 between the host-vehicle 12 and the object 48 is greater (e.g. thirty meters) than the forward-minimum-distance of the minimum-distance-parameter 20, then the controller 14 interprets that to mean that the operator 22 does not want to be any closer than the present value of the distance 46, so the controller 14 increases the forward-minimum-distance of the minimum-distance-parameter 20 to thirty meters, and uses that modified value for future instances when the host-vehicle 12 approaches an other-vehicle from behind the other-vehicle.

The controller 14 may change or modify the parameter 18 (the forward-minimum-distance of the minimum-distance-parameter 20 in this example) after the first occurrence of the operator 22 pressing the brake-pedal, or the controller 14 may wait to modify the parameter 18 until after a similar situation occurs a plurality of times, three for example. When the controller 14 modifies the parameter 18, the modification may be such that the new value of the parameter 18 is equal the value indicated by the manner of the operator, thirty meters in this example. Alternatively, the controller 14 may modify the parameter 18 to a value part-way or a percentage between the initial value of the parameter (twenty meters) and the value indicated by the manner of the operator (thirty meters), e.g. sixty percent which is twenty-six meters for this example. The degree to which a parameter 18 is modified because of a single incident or multiple repeated incidents of the operator 22 overriding the controller 14 is preferably determined by empirical testing of the system 10 using a variety of occupants as test subjects.

As suggested above, the switch 32 may be used by the operator 22 to engage and disengage a learn-mode of the controller 14. If the learn mode is engaged, the controller 14 may modify the parameter 18 to a value equal to the present condition. For the previous example, the forward-minimum-distance of the minimum-distance-parameter 20 would be immediately set to thirty meters when the learn mode is engaged by the operator 22 actuating the switch 32.

In contrast to the previous example where the forward-minimum-distance is increased, the controller 14 may also be configured to decrease the forward-minimum-distance of the minimum-distance-parameter 20 when the operator 22 presses the accelerator-pedal 30 while the distance-signal 50 indicates that a forward-distance (the distance 46) to the object 48 is not greater than the forward-minimum-distance of the minimum-distance-parameter 20. For example, if another vehicle is entering the roadway 40 from an entrance ramp (not shown), the operator 22 may elect to accelerate and thereby temporarily decrease the distance 46 to make room for the entering vehicle behind the host-vehicle 12. If the operator 22 releases the accelerator-pedal 30 after a short time, less than twenty seconds for example, the controller 14 may resume control and re-establish the distance 46 to the forward-minimum-distance of the minimum-distance-parameter 20, and the controller 14 may not decrease the stored value of the forward-minimum-distance of the minimum-distance-parameter 20. However, if the operator 22 operates the accelerator-pedal 30 such that the distance 46 is maintained at some value less than the forward-minimum-distance of the minimum-distance-parameter 20 for a longer period of time, thirty seconds for example, then the controller 14 may modify the value of the forward-minimum-distance of the minimum-distance-parameter 20 to a new value that corresponds to the distance 46 established by the operator 22.

The detector 16 may also be configured to determine a classification 52 of the object 48. As used herein, the classification 52 of the object 48 may include any characteristic of the object 48 that may be useful to improve automated operation of the host-vehicle 12. For example, the classification 52 of the object 48 may include one or more of: a vehicle-size (e.g. small, medium, large), a vehicle-type (e.g. motorcycle, passenger car, heavy-truck), a roadway-structure (e.g. sign-post, bridge abutment, curb, barrier), and a lane-marking (solid line, dashed line, arrow). The controller 14 may be further configured to select the minimum-distance-parameter 20 based on the classification 52 of the object 48. For example, the controller 14 may increase the forward-minimum-distance of the minimum-distance-parameter 20 if the object 48 is a motorcycle because some motorcycles can stop faster than a typical automobile. By way of another example, the controller may increase the rightward-minimum-distance of the minimum-distance-parameter 20 if the detector 16 classifies an object stopped on the right-shoulder (not shown) of the roadway 40 as an emergency-vehicle (e.g. police or ambulance) or a construction-vehicle.

In another embodiment, the system 10 may include a path-planner device 54 used by the controller 14 to select a route for the host-vehicle 12 to follow to a destination selected by the operator 22. The path-planner device 54 may also select the host-travel-lane 42 for the host-vehicle 12 based on the lane-preference-parameter 38. The controller 14 may be configured to modify the lane-preference-parameter 38 when the operator 22 operates the host-vehicle 12 to steer the host-vehicle 12 into a different-lane, e.g. the adjacent-travel-lane 44. For example, the lane-preference-parameter 38 for a three-lane roadway may initially be set to 'right-lane' (the host-travel-lane 42), and the lane-preference-parameter 38 for a three-lane roadway is modified to 'center-lane' (the adjacent-travel-lane 44) after the operator 22 overrides the controller 14 by moving the steering-wheel 26 to steer the host-vehicle 12 from a right lane of the three-lane roadway to a center lane of the three-lane roadway.

The operator 22 may want to modify the lane-preference-parameter 38 because there is a lot of traffic entering or turning off the roadway 40 from/to the right side of the roadway 40, and the operator 22 prefers to travel in the center lane to avoid annoying changes in speed to accommodate such traffic. The operator 22 may actuate the switch 32 to engage and disengage the previously discussed learn-mode so the controller 14 instantly changes the lane-preference-parameter 38 as opposed to requiring the operator 22 to 'hold' the host-vehicle 12 in the center-lane for an extended period of time.

Alternatively, the lane-preference-parameter 38 for a three-lane roadway may be modified to center-lane after the operator 22 'instructs' the controller 14 by operating the turn-signal lever 34 to steer the host-vehicle 12 from the right lane of the three-lane roadway to the center lane of the three-lane roadway. Another alternative is for the operator 22 to use the microphone 36 to give the controller 14 a voice command such as "travel in center lane".

Figure 3:
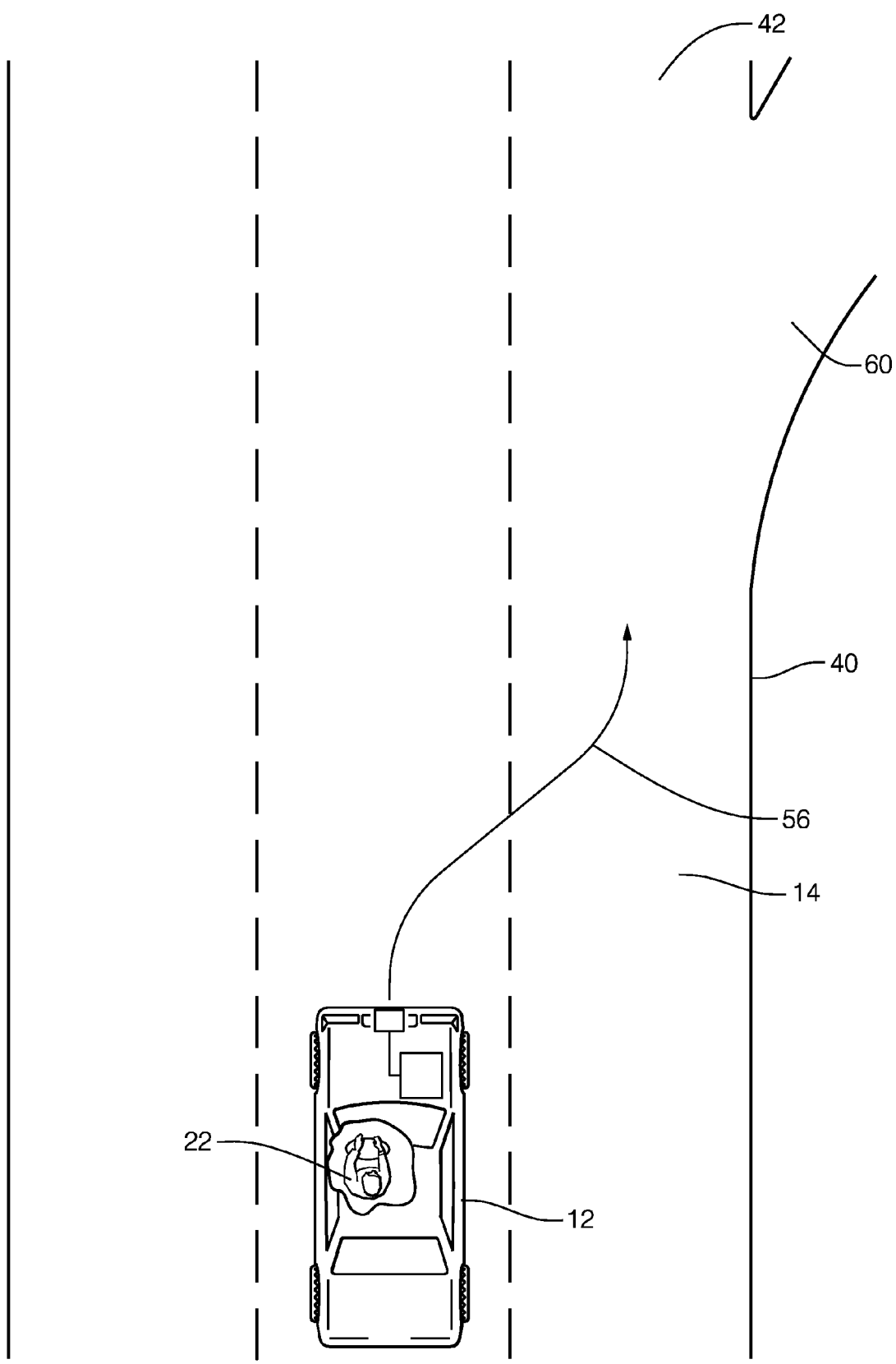
FIG. 3 is top view of a traffic scenario encountered by the system of FIG. 1 in accordance with one embodiment.

FIG. 3 illustrates another non-limiting example of a traffic scenario on the roadway 40. If the host-vehicle 12 is traveling in the center lane, information from the path-planner device 54 may be used by the controller 14 to execute an anticipatory-lane-change 56 based on an anticipation-distance-parameter 58 (FIG. 1). By way of example and not limitation, the host-vehicle 12 may be approaching an exit-ramp 60 that the path-planner device 54 plans to follow, so the host-vehicle 12 should move to the right lane in anticipation of exiting the roadway 40 even though the lane-preference-parameter 38 is set to center-lane. The controller 14 may initially be configured with the anticipation-distance-parameter 58 set to, for example, two-thousand meters so the controller 14 steers the host-vehicle 12 into the right lane two-thousand meters before the exit-ramp 60. However, if there are entrance ramps (not shown) or other exit ramps (not shown) located less than two-thousand meters before the exit-ramp 60, the operator 22 may prefer to stay in the center lane until after the entrance ramps or other exit ramps have been passed.

To override the controller 14, the operator 22 may steer the host-vehicle to remain in the center lane until the exit-ramp 60 is five-hundred meters away, and then either actively make the lane change, or allow the controller 14 to resume control of the host-vehicle and make the anticipatory-lane-change 56. According, the controller 14 may be configured to modify the anticipation-distance-parameter 58 when the operator 22 operates the host-vehicle 12 to steer the host-vehicle 12 in a manner that is not in accordance with the anticipation-distance-parameter 58. It is contemplated that GPS and map data from the path-planner device 54 may also be recorded so that the change to the anticipation-distance-parameter 58 is only applied to the specific geographic location proximate to the location of the exit-ramp 60, and not applied to every situation when the controller executes an anticipatory-lane-change 56 in preparation for some other up-coming turn or exit on some other roadway.

Figure 4:
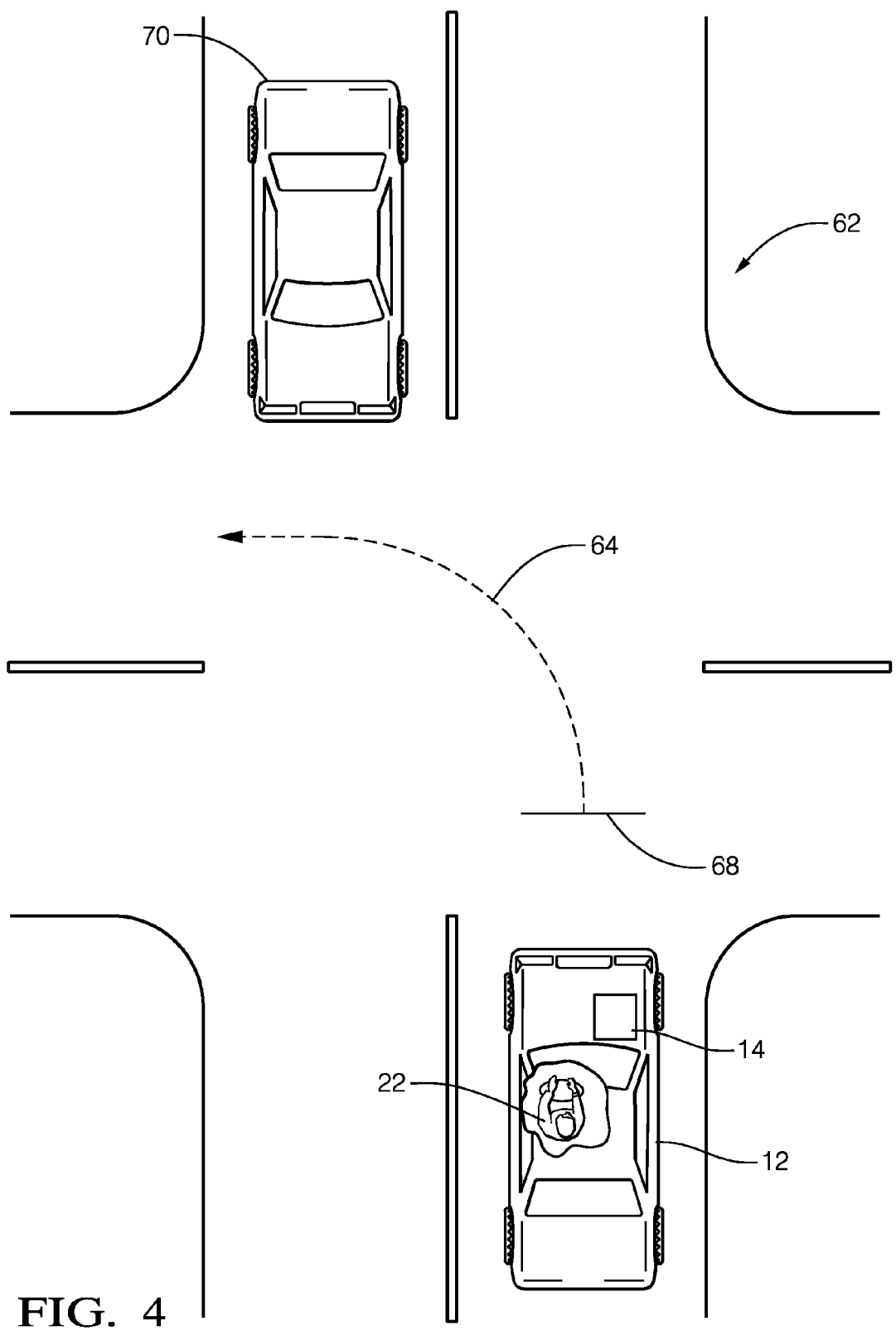
FIG. 4 is top view of a traffic scenario encountered by the system of FIG. 1 in accordance with one embodiment.

FIG. 4 illustrates another non-limiting example of a traffic scenario on the roadway 40. If the host-vehicle 12 is preparing to make a left-turn 64, the controller 14 may be configured to enter an intersection 62 while waiting to make the left-turn 64 based on an intersection-left-turn-parameter 66 (FIG. 1). For example, the controller 14 may be configured to move the host-vehicle 12 forward to a wait-line 68, and hold position until the controller 14 is confident about the intentions of an other-vehicle 70 approaching or preparing to enter the intersection 62. It should be understood that the wait-line 68 is not a road surface marking in the intersection 62, but is rather an imaginary line observed by the controller 14 for operating the host-vehicle. The intersection may be a four-way stop, a two-way stop were either the host-vehicle 12 and the other-vehicle 70 are required to stop, a two-way stop were traffic traveling perpendicular to the illustrated direction of travel of the host-vehicle 12 and the other-vehicle 70 is required to stop, or a traffic-light (not shown) controlled intersection.

The controller 14 may be initially configured to proceed forward to the wait-line 68 based on an initial value of the intersection-left-turn-parameter 66 stored in the controller 14. However, if the operator 22 is unsure about the intentions of the other-vehicle 70 the operator may press on the brake-pedal 28 to prevent the host-vehicle 12 from moving forward from the position illustrated in FIG. 4. For example, the operator 22 may sense that the operator of the other-vehicle 70 is in a hurry to also make a left turn, so the operator 22 may elect to wait and not block the intersection 62. Accordingly, the controller 14 may be configured to modify the intersection-left-turn-parameter 66 when the operator 22 presses on the brake pedal to apply the brakes and thereby prevent the controller 14 from operating the host-vehicle 12 to enter the intersection 62 while waiting to make the left-turn 64.

Accordingly, a system 10 for automated operation of a host-vehicle 12 and a controller 14 for the system 10 is provided. When the controller 14 is initially installed in the host-vehicle 12, the parameter 18 or a variety of parameters may be pre-programmed into the controller 14. However, since the driving habits of various people differ, it is likely that the behavior of the host-vehicle 12 during automated operation will not always be in accordance with the preferences of the operator 22 of the host-vehicle 12. To address this problem, the system 10, or more specifically the controller 14, is configured so that the controller 14 can learn the preferences of the operator 22, and modify one or more of the relevant parameters so that over time the controller 14 learns to operate the host-vehicle 12 in a manner that is more to the liking of the operator 22.

While this invention has been described in terms of the preferred embodiments thereof, it is not intended to be so limited, but rather only to the extent set forth in the claims that follow.

We claim:

1. A system for automated operation of a host-vehicle, said system comprising:
a controller configured to operate the host-vehicle during automated operation of the host-vehicle and do so in accordance with a parameter stored in the controller, determine when an operator of the host-vehicle uses a vehicle-control-input to override the controller and thereby manually operate the host-vehicle in a manner different from that which is in accordance with the parameter, and modify the parameter stored in the controller for use by the controller during future automated operation of the host-vehicle, wherein the parameter is modified based on the manner of the operator.

2. The system in accordance with claim 1, wherein the vehicle-control-input includes a brake-pedal, an accelerator-pedal, and a steering-wheel operable to override the controller.

3. The system in accordance with claim 1, wherein the system includes a turn-signal lever, a switch, and a microphone operable to instruct the controller to modify the parameter.

4. The system in accordance with claim 1, wherein the system includes
- a detector configured to detect a distance to an object proximate to the host-vehicle and provide a distance-signal to the controller indicative of the distance, and
- the controller is configured to operate the host-vehicle in accordance with the distance-signal and a minimum-distance-parameter, wherein the controller modifies the minimum-distance-parameter when the operator overrides the controller and operates the host-vehicle in a manner that prevents the controller from operating the host-vehicle in accordance with the minimum-distance-parameter.

5. The system in accordance with claim 4, wherein the minimum-distance-parameter includes a forward-minimum-distance, a rearward-minimum-distance, a leftward-minimum-distance, and a rightward-minimum-distance.

6. The system in accordance with claim 5, wherein the controller increases the forward-minimum-distance of the minimum-distance-parameter when the operator presses a brake-pedal while the distance-signal indicates that a forward-distance to the object is greater than the forward-minimum-distance.

7. The system in accordance with claim 5, wherein the controller decreases the forward-minimum-distance of the minimum-distance-parameter when the operator presses an accelerator-pedal while the distance-signal indicates that a forward-distance to the object is not greater than the forward-minimum-distance.

8. The system in accordance with claim 4, wherein the detector is further configured to determine a classification of the object, and the controller selects the minimum-distance-parameter based on the classification of the object.

9. The system in accordance with claim 8, wherein the classification of the object includes a vehicle-size, a vehicle-type, a roadway-structure, and a lane-marking.

10. The system in accordance with claim 1, wherein the system includes
- a path-planner device used by the controller to select a host-travel-lane for the host-vehicle based on a lane-preference-parameter, and the controller is configured to modify the lane-preference-parameter when the operator operates the host-vehicle to steer the host-vehicle into a different-lane.

11. The system in accordance with claim 10, wherein the lane-preference-parameter for a three-lane roadway is initially set to right-lane, and the lane-preference-parameter for a three-lane roadway is modified to center-lane after the operator overrides the controller by moving the steering-wheel to steer the host-vehicle from a right lane of the three-lane roadway to a center lane of the three-lane roadway.

12. The system in accordance with claim 10, wherein the lane-preference-parameter for a three-lane roadway is initially set to right-lane, and the lane-preference-parameter for a three-lane roadway is modified to center-lane after the operator instructs the controller by operating the turn-signal lever to steer the host-vehicle from a right lane of the three-lane roadway to a center lane of the three-lane roadway.

13. The system in accordance with claim 1, wherein the system includes
- a path-planner device used by the controller to select a host-travel-lane for the host-vehicle based on a lane-preference-parameter.

14. The system in accordance with claim 13, wherein the controller is configured to modify the lane-preference-parameter when the operator operates a turn-signal lever to instruct the controller to modify the lane-preference parameter.

15. The system in accordance with claim 13, wherein the controller is configured to modify the lane-preference-parameter when the operator turns the steering wheel to override the controller and thereby instruct the controller to modify the lane-preference parameter.

16. The system in accordance with claim 13, wherein the path-planner device is used by the controller to execute an anticipatory-lane-change based on an anticipation-distance-parameter, and the controller is configured to modify the anticipation-distance-parameter when the operator operates the host-vehicle to steer the host-vehicle in a manner that is not in accordance with the anticipation-distance-parameter.

17. The system in accordance with claim 1, wherein the controller is configured to operate the host-vehicle to enter an intersection while waiting to make a left-turn based on an intersection-left-turn-parameter, and the controller is configured to modify the intersection-left-turn-parameter when the operator presses the brake-pedal to prevent the host-vehicle from entering the intersection while waiting to make the left-turn.

* * * * *